Sept. 7, 1943. D. G. C. LUCK 2,328,985
PHASE INDICATING APPARATUS
Filed Oct. 31, 1941
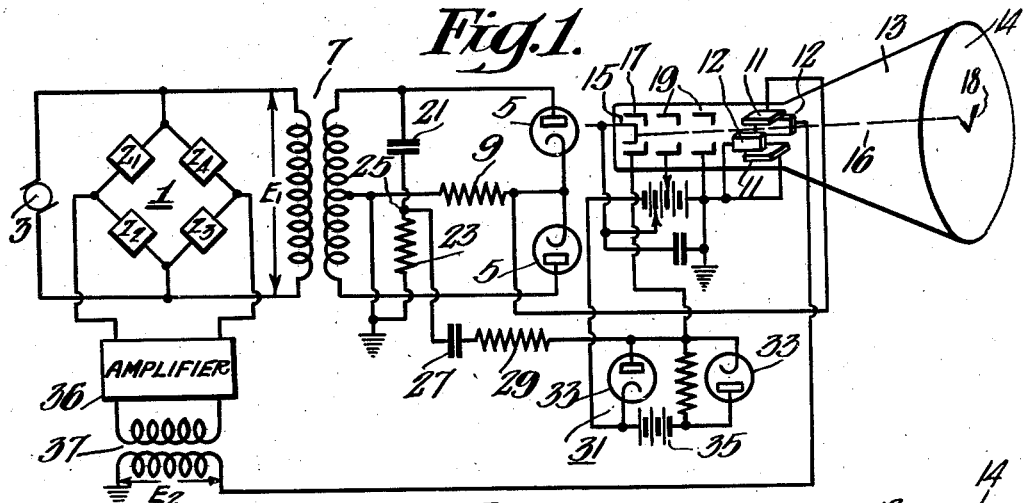
Fig. 1.
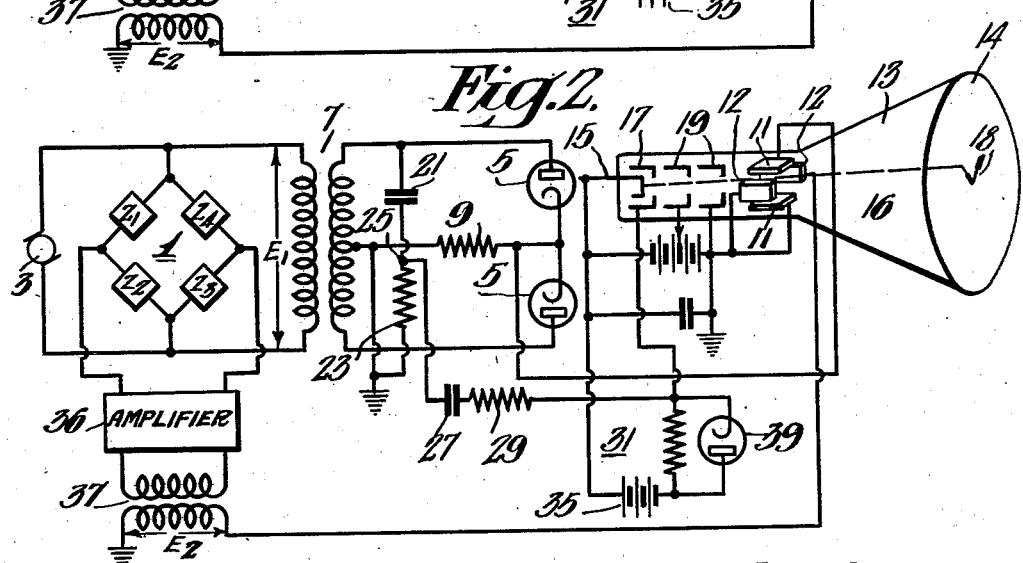
Fig. 2.
Fig. 3a.
Fig. 3b. Fig. 3c.
Fig. 3d.
Fig. 3e.
Fig. 3f.
Inventor
David G. C. Luck
By
J. Huff
Attorney Patented Sept. 7, 1943

2,328,985

UNITED STATES PATENT OFFICE 2,328,985

PHASE INDICATING APPARATUS

David G. C. Luck, Merchantville, N. J., assignor to Radio Corporation of America, a corporation of Delaware Application October 31, 1941, Serial No. 417,390

14 Claims. (Cl. 172—245)

This invention relates to vector comparison of two voltages, and more particularly to a bridge balance indicator, the present invention being in the nature of an improvement over the impedance bridge balance indicator disclosed in the U. S. Patent to Luck and Cook 2,147,746.

In the aforesaid patent, there is disclosed a unitary cathode ray tube impedance bridge balance indicator which shows the amount and direction of in-phase and quadrature unbalance components of an impedance network, as well as the condition of quadrature balance with considerable in-phase unbalance. This type of indicator, however, is not well suited to the indication of in-phase balance in the presence of strong quadrature unbalance, nor does it give a qualitatively unique indication of complete balance.

The primary object of my present invention is to provide an improved unitary bridge balance indicator which is not subject to the above noted limitations and which will provide a maximum of information.

More particularly, it is an object of my present invention to provide an improved bridge balance indicator which will not only afford a qualitatively unique indication of complete balance of both the resistive and reactive components of the bridge impedances, but will also indicate the condition of resistive balance even in the presence of strong reactive unbalance and vice versa.

Another object of my present invention is to provide an improved method of and means for indicating the sign and order of magnitude of both in-phase and quadrature phase components of any unknown alternating voltage with respect to a reference voltage synchronous therewith.

Still another object of my present invention is to provide an improved method of and means for determining the relation between a pair of synchronous voltages, one of which may be a reference voltage and the other an unknown voltage, and for adjusting said voltages to be exactly in or out of phase, or in leading or lagging phase quadrature, as well as definitely detecting the reduction of the unknown voltage to zero.

It is also an object of my present invention to provide an improved impedance bridge balance indicator as above set forth which is relatively simple in construction and which may be successfully operated with high efficiency even by one not skilled in the art.

In accordance with my present invention, I apply a sinusoidal alternating reference voltage, which may be derived from the generator energizing an impedance bridge, for example, through a full-wave rectifier to the vertical deflecting system of a cathode ray oscillograph and, through a phase shifting network and a voltage limiter, I apply to the beam intensity controlling electrode of the oscillograph an alternating voltage of rectangular wave-form derived from the reference voltage but shifted substantially 45° in phase therefrom. The limiter may consist of a pair of biased diodes of opposite polarity looking down a high impedance source with the applied voltage in excess of the bias, or current to the beam control electrode of the oscillograph may replace one of the diodes. The unknown alternating voltage, which may be that appearing across the output terminals of the impedance bridge, is applied at a suitable level to the horizontal deflection system of the oscillograph. In a system of this sort, the deflected beam will trace a pattern on the screen of the oscillograph which is indicative of the phase and amplitude relations between the reference voltage and the unknown voltage. By observing this pattern, these relations can be easily ascertained. If it is desired to bring these two voltages into a predetermined phase relation, the impedance of one or more of the arms of the bridge may then be adjusted to produce the desired result.

The novel features that I consider characteristic of my invention are set forth with particularity in the appended claims. The invention itself, however, both as to its organization and method of operation, as well as additional objects and advantages thereof, will best be understood from the following description of two embodiments thereof, when read in connection with the accompanying drawing, in which Figure 1 is a wiring diagram of a system embodying one form of my invention, Figure 2 is a wiring diagram of a system embodying a slightly modified form of the invention, and Figures 3a, 3b, 3c, 3d, 3e and 3f are indicator patterns typical of various conditions of balance and unbalance of an impedance bridge.

Referring more particularly to the drawing, wherein similar reference characters designate corresponding parts throughout, there is shown, in Fig. 1, an impedance bridge having two-terminal impedance networks $Z_1$, $Z_2$, $Z_3$ and $Z_4$ of any suitable type in the four arms thereof. An alternating voltage $E_1$ from a source 3 is applied across one diagonal of the bridge 1, the voltage $E_1$ being also supplied to a full-wave rectifier 5 through a transformer 7, the secondary winding of which has a mid-tap connected to ground. A rectifier output resistor 9 is connected between the cathodes of the rectifiers 5 and the grounded mid-tap of the transformer secondary winding. The output of the rectifier 5 is applied to the vertical deflecting plates 11 of a cathode ray tube 13 provided with an electron emissive cathode 15, an intensity control electrode 17 and one or more anodes 19, the electrodes 17 and 19 being constructed and arranged to define and direct upon the electron sensitive screen 14 of the tube 13 an electron beam 16 supplied by the cathode 15.

Connected also to the voltage source 3, in any suitable manner, is a phase shifting network which, for greatest convenience, is preferably arranged to shift the voltage substantially 45° in phase, although it may be designed to shift the voltage any other angle which may be found desirable. In the modifications shown in the drawing, this network comprises a capacitor 21 and a resistor 23 connected in series and is connected between one end of the secondary winding of the transformer 7 and the grounded mid-tap thereof. The junction 25 of the capacitor 21 and the resistor 23 is connected through a series-connected isolating capacitor 27 and resistor 29 to a voltage limiter 31 comprised of a pair of diodes 33 biased by a battery 35. The square wave output of the limiter 31 is applied to the control electrode 17 of the cathode ray tube 13. The resistor 29 affords a high impedance path between the junction 25 and the limiter 31, thus providing a voltage source of such poor regulation that it can only drive the control electrode 17 over the range of voltage bounded by the terminal voltages of the battery 35 because of the non-linear loading action of the limiter diodes 33.

Connected across the second diagonal of the impedance bridge 1 is an amplifier 36 to the output of which is connected a transformer 37 for supplying an unknown voltage $E_2$, at a suitable level, to the horizontal deflecting plates 12 of the tube 13. The voltage $E_2$ is, of course, dependent upon the impedances $Z_1$, $Z_2$, $Z_3$ and $Z_4$ in the arms of the bridge. As a result of the intensity control provided by the electrode 17 in response to the phase shifted and limited alternating voltage derived from the network 21, 23 and the deflection of the electron beam effected by the deflecting plates 11, 11 and 12, 12, the beam 16 will be caused to trace a pattern 18 on the screen 14 indicative of the relation between the reference voltage $E_1$ and the unknown voltage $E_2$.

Fig. 3a shows what the pattern 18 would be if a complete balance of the impedance bridge 1 existed. This pattern signifies that the voltage $E_2$ is zero. Fig. 3b shows the pattern 18 representative of a condition of partial balance of the impedance bridge such that the component of the unknown voltage $E_2$ which is in phase quadrature with the source voltage $E_1$ is reduced to zero magnitude. Fig. 3c shows the pattern 18 in the case of balance of the quadrature component but with the residual in-phase component of voltage $E_2$ of polarity opposite to that giving the pattern of Fig. 3b. That is, if Fig. 3b represents voltage $E_2$ in phase with voltage $E_1$, Fig. 3c represents voltage $E_2$ 180° out of phase with voltage $E_1$. In Fig. 3d is shown a pattern 18 representing a partial bridge balance in which the in-phase component of voltage $E_2$ has been reduced to zero. That is to say, when the condition represented by the pattern of Fig. 3d prevails, the phase of the unknown voltage $E_2$ is different by 90° from the phase of voltage $E_1$. Fig. 3e shows a similar condition where the in-phase component of voltage $E_2$ is balanced to zero but the residual quadrature component of the unknown voltage $E_2$ is of polarity opposite to that in the condition of Fig. 3d. That is, if, in Fig. 3d, voltage $E_2$ leads voltage $E_1$ in phase by 90°, then Fig. 3e shows the case where voltage $E_2$ lags by 90°. For any other condition, neither the in-phase component nor the quadrature component of voltage $E_2$ will be balanced to zero magnitude and there is a general unbalance which is represented by the folded elliptical pattern shown in Fig. 3f. In the patterns of Figs. 3a–f, the widest or thickest portions thereof indicate greatest brillance of the trace, the thinnest portions thereof indicate the least brillance of the trace, and the intermediate thicknesses thereof indicate intermediate trace brilliance.

It is obvious that, by adjusting one or more of the impedances $Z_1$, $Z_2$, $Z_3$ and $Z_4$, any one of the conditions represented by the patterns of Figs. 3a to 3f, inclusive, may be obtained. It is further clear that the presence, sense and approximate amount of either the in-phase or quadrature type of unbalance is clearly shown despite the possible presence of a considerable degree of unbalance of the other type.

The modification of my invention shown in Fig. 2 is very similar to that shown in Fig. 1, with the exception that in place of the pair of diodes 33, only one diode 39 is employed, current therefrom being supplied to the intensity control electrode 17. The function of the other diode is performed in this modification by current drawn by the control electrode 17 when at a voltage more positive than that of the cathode 15.

Although I have shown and described two forms of my invention, it will be apparent to those skilled in the art that many other modifications thereof, as well as changes in those described, are possible. I therefore desire that my invention shall not be limited except insofar as is made necessary by the prior art and by the spirit of the appended claims.

I claim as my invention:

1. The method of determining with the aid of an electron beam the phase relation between a pair of alternating voltages having a predetermined frequency relation which comprises deriving from one of said voltages a third voltage shifted in phase substantially 45° from said one voltage, causing said phase shifted voltage to control the intensity of said electron beam, deriving from said one voltage a rectified voltage, simultaneously causing said rectified voltage and the second of said pair of voltages to distinguishably deflect said electron beam from its normal path, and causing said deflected beam to produce a visible indication of its deflected path indicative of the phase relation between said pair of alternating voltages.

2. The method of determining with the aid of an electron beam the phase relation between a pair of alternating voltages having a predetermined frequency relation which comprises deriving from one of said voltages a third voltage of square wave form shifted in phase substantially 45° from said one voltage, causing said phase shifted voltage to control the intensity of said electron beam, deriving from said one voltage a rectified voltage, simultaneously causing said rectified voltage and the second of said pair of voltages to distinguishably deflect said electron beam from its normal path, and causing said deflected beam to produce a visible indication of its deflected path indicative of the phase relation between said pair of alternating voltages.

3. The method of determining with the aid of a cathode ray tube having electron beam forming means the phase relation between two alternating voltages having a predetermined frequency relation which comprises deriving from one of said voltages a third voltage shifted in phase substantially 45° from said one voltage, causing said phase shifted voltage to control the intensity of said beam, rectifying said one voltage, causing said rectified voltage to deflect said beam in one direction, and simultaneously causing the second of said two voltages to deflect said beam in a second direction substantially normal to said first named direction whereby said beam is caused to trace a path on the screen of said tube indicative of the phase relation between said two voltages.

4. The method of determining with the aid of a cathode ray tube having electron beam forming means the phase relation between an alternating reference voltage and a second alternating voltage having a predetermined frequency relation to said reference voltage which comprises deriving from said reference voltage a third alternating voltage of square wave form and shifted in phase substantially 45° from said reference voltage, causing said third voltage to control the intensity of said beam, rectifying said reference voltage, causing said rectified voltage to deflect said beam in one direction, and simultaneously causing said second voltage to deflect said beam in a second direction substantially normal to said first named direction whereby said beam is caused to trace a path on the screen of said tube indicative of the phase relation between said reference voltage and said second voltage.

5. The method of determining with the aid of a cathode ray tube having electron beam forming means the phase relation between an alternating reference voltage and a second alternating voltage having a predetermined frequency relation to said reference voltage which comprises deriving from said reference voltage a third alternating voltage shifted in phase substantially 45° from said reference voltage, limiting said phase shifted voltage, causing said limited voltage to control the intensity of said beam, rectifying said reference voltage, causing said rectified voltage to deflect said beam in one direction, and simultaneously causing said second voltage to deflect said beam in a second direction substantially normal to said first named direction whereby said beam is caused to trace a path on the screen of said tube indicative of the phase relation between said reference voltage and said second voltage.

6. The method of effecting a balance of an impedance bridge with the aid of a cathode ray tube having electron beam providing means which comprises applying to the input of said bridge an alternating voltage constituting a reference voltage, deriving from said bridge an alternating unknown voltage having a predetermined frequency relation to said reference voltage, deriving from said reference voltage another voltage of square wave form shifted in phase substantially 45° from said reference voltage, causing said shifted voltage to control the intensity of said beam, deriving from said reference voltage a rectified voltage, simultaneously causing said rectified voltage and said unknown voltage to deflect said beam from its normal path whereby to trace on the screen of said tube a pattern indicative of the phase relation between said reference and unknown voltages, observing said pattern, and finally adjusting the impedance of one or more of the arms of said bridge until a predetermined pattern is produced on said screen indicative of the balance of said bridge.

7. The method set forth in claim 6 characterized in that said reference voltage is applied to one diagonal of said bridge and characterized further in that said unknown voltage is derived from the other diagonal of said bridge.

8. In apparatus for indicating the phase relation between a pair of alternating voltages, the combination with a cathode ray tube including an electron sensitive screen, means within said tube for providing and directing onto said screen an electron beam, and means for controlling the intensity of said beam, of means for deriving from one of said voltages a third voltage of square wave form shifted in phase substantially 45° from said one voltage and having a predetermined frequency relation to said one voltage, means for applying said phase shifted voltage to said intensity controlling means, means for rectifying said one voltage, and means for causing said rectified voltage and the other of said pair of alternating voltages to displace said electron beam from its normal path whereby to cause said beam to trace a pattern on said screen indicative of the phase relation between said pair of alternating voltages.

9. In apparatus for indicating the phase relation between a pair of alternating voltages, the combination with a cathode ray tube including an electron sensitive screen, means within said tube for providing and directing onto said screen an electron beam, and means for controlling the intensity of said beam, of means for deriving from one of said voltages a third voltage shifted in phase substantially 45° from said one voltage and having a predetermined frequency relation to said one voltage, means for limiting said phase shifted voltage, means for applying said limited voltage to said intensity controlling means, means for rectifying said one voltage, and means for causing said rectified voltage and the other of said pair of alternating voltages to displace said electron beam from its normal path whereby to cause said beam to trace a pattern on said screen indicative of the phase relation between said pair of alternating voltages.

10. The invention set forth in claim 9 characterized in that said phase shifting means comprises a capacity-resistance network.

11. The invention set forth in claim 9 characterized in that said rectifying means is constituted by a full wave rectifier.

12. In combination, an impedance bridge, a source of alternating voltage connected across one diagonal of said bridge, a transformer including a primary winding also connected across said diagonal and providing an alternating reference voltage, means connected across the other diagonal of said bridge providing an unknown alternating voltage dependent upon the impedances of the arms of said bridge and having a predetermined frequency relation to said reference voltage, a phase shifting network connected across at least a portion of the secondary winding of said transformer, a voltage limiter, means providing a path between said network and said limiter and being so connected to said network as to derive therefrom a voltage shifted substantially 45° in phase from said reference voltage, a full-wave rectifier connected to said secondary winding for rectifying the alternating voltages supplied thereby, a cathode ray tube including an electron sensitive screen, means therewithin for providing and directing an electron beam onto said screen, an intensity control electrode associated with said beam, and electron beam deflecting means, means coupling the output of said limiter to said intensity control electrode whereby said phase-shifted and limited voltage controls the intensity of said beam, and means for applying said rectified and said unknown voltage to said beam deflecting means for effecting displacement of said electron beam from its normal path whereby said beam is caused to trace a pattern on said screen indicative of the phase relation between said reference and unknown voltages.

13. The invention set forth in claim 12 characterized in that said phase shifting network comprises a capacitor and a resistor connected in series.

14. The invention set forth in claim 12 characterized in that said phase shifting network comprises a capacitor and a resistor connected in series, characterized further in that said path providing means has a high impedance, and characterized still further in that said means is connected to said last named network at the junction of said capacitor and said resistor.

DAVID G. C. LUCK.